Oct. 11, 1949.  H. G. BELL ET AL  2,484,398
MACHINE FOR CLINCHING A HOOP CONNECTING
MEMBER AND THE LIKE
Filed April 20, 1949  2 Sheets-Sheet 2
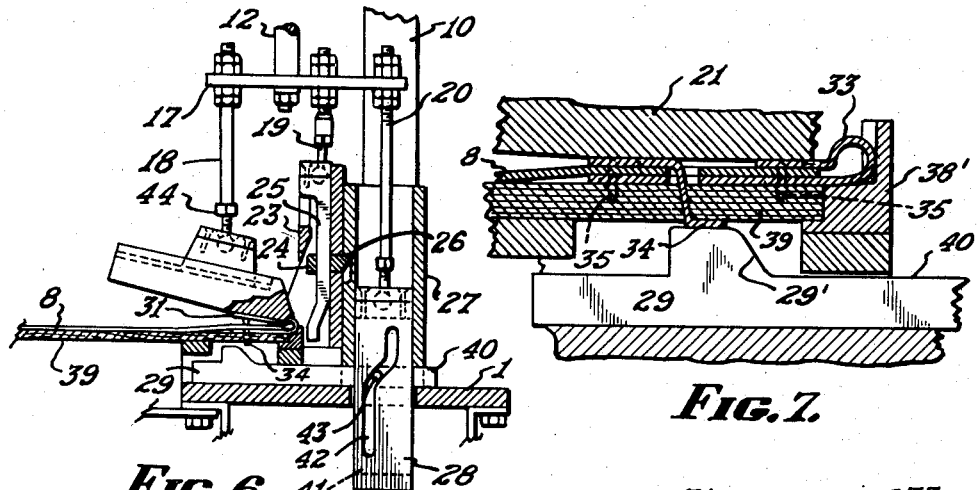
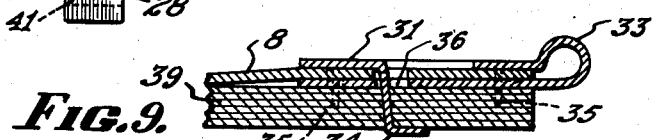
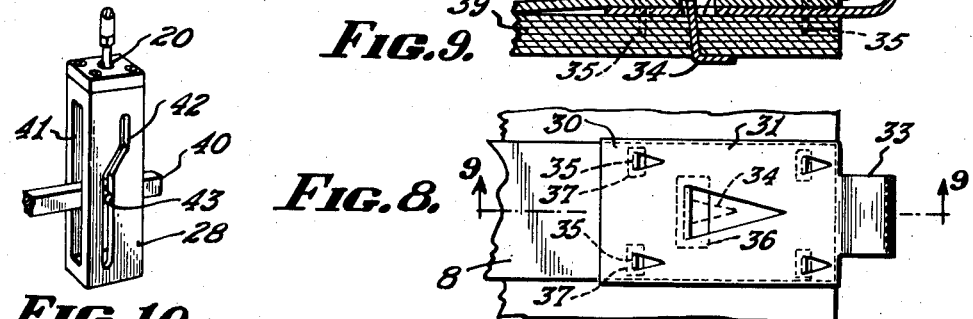
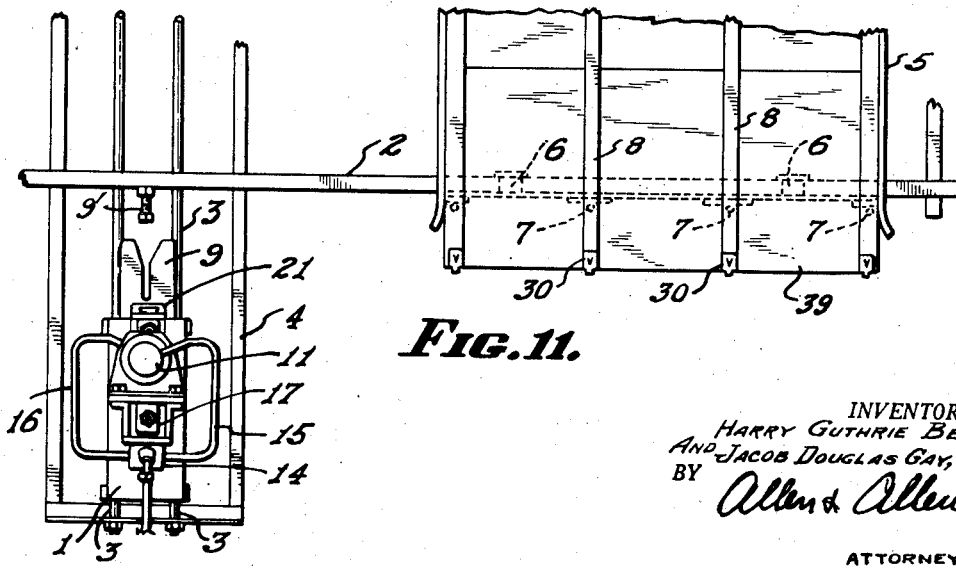
INVENTORS.
HARRY GUTHRIE BELL
AND JACOB DOUGLAS GAY, JR.,
BY
*Allen & Allen*
ATTORNEYS.

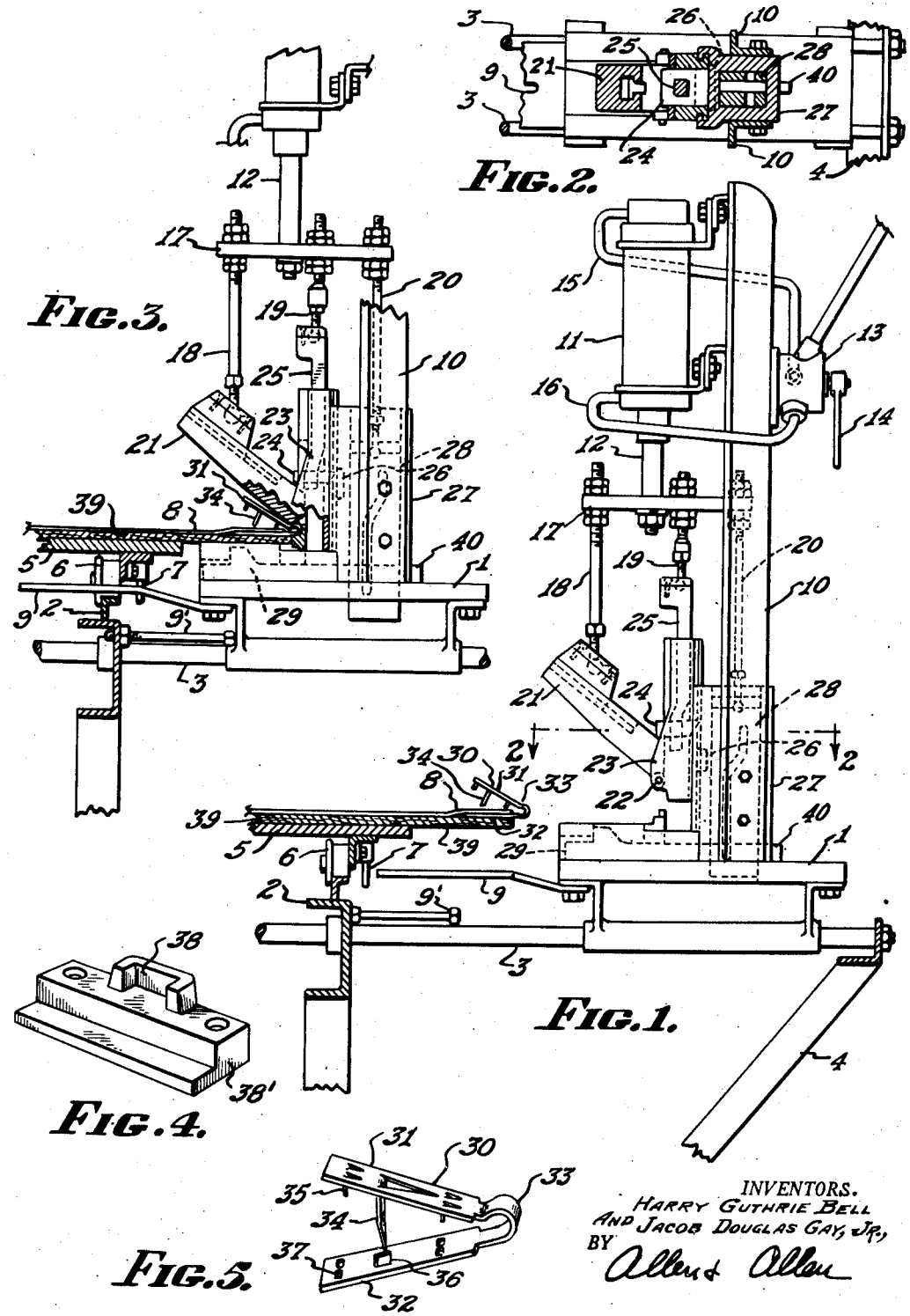

Patented Oct. 11, 1949

2,484,398

UNITED STATES PATENT OFFICE 2,484,398

MACHINE FOR CLINCHING A HOOP CONNECTING MEMBER AND THE LIKE

Harry Guthrie Bell, Paris, and Jacob Douglas Gay, Jr., Lexington, Ky., assignors to Gay-Bell Corporation, Paris, Ky., a corporation of Kentucky Application April 20, 1949, Serial No. 88,634

11 Claims. (Cl. 1—4)

Our invention relates to a machine for clinching hoop connecting members as described in our copending application, Serial No. 689,882, filed August 12, 1946, and particularly shown in Figures 4, 5, and 6 thereof.

In assembling knock-down barrels, the hoop connecting member is positioned over the end of a hoop and on top of the end of a barrel stave. The connecting member is then clinched so that the end of the hoop is sandwiched between the leaves of the member and so that the prong on one of the leaves projects through the other leaf, the hoop, and the barrel stave. The prong is then turned over and clinched so as to hold the connecting member, the hoop end, and the barrel stave tightly together.

It is an object of our invention to provide a machine which in operation folds the two leaves of the member into place and forces the prong through the stave at the same time turning over and clinching the end of the prong on the other side of the stave.

It is a further object of our invention to provide a machine as described above which does not injure or close the eye or pintle aperture between the leaves of the connecting member.

It is a further object of our invention to provide a machine which insures the positioning of the different related parts and holds them in position, while the member is being clinched to and through the end of the barrel stave.

It is a further object of our invention to provide a machine as described above which is quick and powerful in its action and which is rugged and relatively simple to operate and maintain.

These and other objects of our invention which will be set forth hereinafter or will be apparent to one skilled in the art upon reading these specifications, we accomplish by that certain construction and arrangement of parts of which we shall now describe an exemplary embodiment. Reference is now made to the drawings which form a part hereof and in which:

Figure 1 is a side elevation of our machine in a non-operative position or the position just prior to the entry of the connecting member into the machine.

Figure 2 is a cross section of the lower portion of our machine taken on the section line 2—2 of Figure 1.

Figure 3 is a side elevation of the machine shown in Figure 1, but after the connecting member has entered the machine and after one end of the clinching ram has been lowered to hold the connecting member in place.

Figure 4 is a perspective view of an anvil or seat for the eye or pintle aperture of the connecting member.

Figure 5 is a perspective view of the connecting member which is acted upon by the machine and is similar to that shown in Figures 4, 5, and 6 of our copending application, Serial No. 689,882, filed August 12, 1946.

Figure 6 is a side elevation similar to Figure 3 and Figure 1 with a portion in section showing our machine after the clinching ram has moved downwardly further than in Figure 3.

Figure 7 is an enlarged section of the lower portion of our machine at the completion of its progressive operations.

Figure 8 is a plan view of the connecting member after it has been clinched by our machine.

Figure 9 is a cross section taken on the section line 9—9 of Figure 8.

Figure 10 is a perspective view of the cam plunger in a position just prior to moving the prong clinching anvil.

Figure 11 is a plan view of the machine and the work conveyor which feeds the material to the machine.

Briefly, in the practice of our invention, we provide a machine which is positioned alongside of the work conveyor and which may be slid forwardly over the work when a hoop connecting member is positioned opposite the machine. Provision is made for registering the machine in relation to the connecting member so that the eye or pintle aperture of the connecting member will position itself within the seat. In this position, a pneumatic piston forces down a yoke having three connecting rods. As the yoke comes down, one of the connecting rods by means of a cam rod brings down and latches one edge of the clinching ram in order to protect the eye of the connecting member and also to present a fulcrum for the clinching ram.

As the yoke continues its movement downwardly, the clinching ram is brought down over the leaves of the connecting member, forcing them together and also forcing the downwardly projecting prong on the upper leaf through an aperture in the hoop, an aperture in the lower leaf, and through the end of the barrel stave. During this action, as the yoke continues downwardly, a third connecting rod forces down a cam plunger which in turn moves the prong clinching anvil to the right, thus upsetting the prong and clinching the same against the bottom of the stave. The valve controlling the pneumatic piston is then reversed, which withdraws the clinching ram from the work and brings the machine back to its original position. The machine is then pulled back from the edge of the work and the work moves along the conveyor until the necessary connecting member is aligned with the machine.

Referring to the drawings, our machine comprises a base 1 which is slidable to and from the conveyor 2 on the rods 3. The rods 3 are braced by means of the angle straps 4. The conveyor carriage 5 which runs on rollers 6 has a downwardly projecting pin 7 which is positioned in reference to the work 8 on the carriage 5.

Fastened to the base 1 of the machine is a bifurcated strap 9 which straddles the pin 7 when the base 1 is moved towards the work (see Figure 3). An adjustable abutting bolt 9' determines the distance the base 1 may approach the work.

On the base 1 are upstanding supports 10 which carry a pneumatic cylinder 11. The cylinder 11 contains a piston which actuates a piston rod 12. A valve 13 operated by the handle 14 permits the alternate application of air pressure on either side of the piston through inlets 15 and 16. As is apparent, in one position of valve 14, the piston rod 12 will be forced upwardly.

Fastened to the end of the piston rod 12 is a yoke 17. Projecting downwardly from the yoke 17 are three connecting rods 18, 19, and 20. The end of rod 18 carries a ball which is connected to the clinching ram 21. An end of the clinching ram 21 remote from its connection with the rod 18 is joined by means of the pintle 22 to a casting 23. The casting 23 is slidable upwardly and downwardly with the ram 21. Within the casting 23 is a latch 24 which is operated by cam rod 25. The cam rod 25 is attached to the end of the connecting rod 19 and moves upwardly and downwardly with the yoke 17.

From the above description, it is apparent that as the yoke 17 moves downwardly lowering the clinching ram 21 and the casting 23, the cam rod 25 moves with it. However, the latch 24 is withdrawn into the casting 23 by the lower end of the cam rod 25. When the casting 23 hits bottom and bases itself, and the yoke 17 continues to move downwardly, the cam rod 25 slides downwardly through the latch 24 and moves the latch 24 outwardly until it engages a notch 26 within the side wall of a square housing 27. As soon as the latch 24 latches in the notch 26, the casting 23 acts as a fulcrum base for the clinching ram 21. The cam plunger 28 and its action on the prong clinching anvil 29 will be described later.

The hoop connecting member 30 consists of an upper leaf 31 and the lower leaf 32 joined together by the eye or pintle aperture 33. There is a punched out long prong 34 projecting downwardly from the upper leaf 31 and prongs or spurs 35 also projecting downwardly. There is an aperture 36 in the lower leaf 32 to receive and pass the prong 34 as well as smaller apertures 37 to accommodate the small prongs 35.

When the machine is in operative position, the eye 33 of the conecting member 30 rests in the seat 38 of the anvil 38'. In the event the eye 33 is a single eye, as shown in Figure 5, the seat 38 is as shown in Figure 4. In the event the eye 33 is a double eye, the seat 38 is made longer. This seat 38 protects the eye 33 from being crushed.

Underlying the stave 39 below the connecting member is the prong clinching anvil 29. At the beginning of the operation and during the first part of the operation, the anvil 29 is to the left and a slanted portion 29' is positioned to the left of the spot where the prong 34 will pierce the stave 39. The anvil 29 has an arm portion 40 which projects through the box-like housing 27 and through a slot 41 in the cam plunger 28. The cam plunger 28 has a cam track 42 in which rides a pintle 43 projecting through the arm 40 of the anvil 29.

The upper end of the cam plunger 28 is fastened to the connecting rod 20 which in turn is attached to the yoke 17.

The connecting rods 18, 19 and 20 are fastened to the yoke 17 by means of nuts as shown in Figure 6. This method of fastening permits the adjustment as to the relative length of the connecting rods 18, 19 and 20 and it is sometimes preferable to provide other adjustments, such as the nuts 44 or other means which permit the relative adjustment of the connecting rods.

After the work is in place and the hoop connecting member is seated in the anvil seat 30 and over the prong clinching anvil 29, the operation of the device is as follows:

The handle 14 of the valve 13 is actuated so as to permit the pneumatic medium to force the piston in the cylinder 11 downwardly. This in turn forces the piston rod 12 and the yoke 17 in a downward direction. As the connecting rods 18, 19, and 20 move downwardly, the casting 23 first seats and the latch member 24 engages in the slot 26 holding the casting 23 in its bottom position. As the yoke 17 continues to move downwardly, the clinching ram 21 commences to close against the work and forces the two leaves 31 and 32 together at the same time forcing the prong 34 through apertures in the hoop 8, the lower leaf 32 and through the stave 39. As the yoke 17 continues downwardly, the cam plunger 28 reaches the position where the pintle 34 on the arm 40 of the prong clinching anvil 29 arrives at the slanted portion of the cam track 42 and commences to move the anvil 29 to the right. This position is best shown in Figure 6. As the prong 34 comes through the stave 39, it contacts the beveled portion 29' of the anvil 29 which is moving to the right. As this continues, the prong clinching anvil 29 wipes over and clinches the end of the prong 34, as shown in Figure 7. In the position shown in Figure 7, the clinching ram is directly pressing against the horizontal surface of the prong clinching anvil 29, thus finally clinching and locking the connecting member to the hoop 8 and the stave 39. It is to be noted that the small prongs 35 dig into the stave 39, but do not pierce completely through. Now the valve handle 14 is again actuated to raise the piston in the cylinder 11, which returns the connecting rods 18, 19 and 20 and the mechanism which they actuate to their original position shown in Figure 1, and the whole machine may be withdrawn from the work on the rods 3.

It is apparent from the above description that the action of the clinching ram 21 is timed in its movements in reference to the movement of the prong clinching anvil 29 so that the complete operation is smooth and positive in its action.

From the above, it is apparent that we have provided a clinching machine which is simple in operation and rugged in construction and wherein repairs and adjustments are relatively simple, but which quickly and easily performs the operation for which it is designed.

While in the above description we have referred to the yoke being operated by a pneumatic drive, this is not intended as a limitation on our invention since the device may be driven hydraulically, mechanically, electrically or in numerous other ways.

It is to be understood that the description and drawing are merely exemplary and that modification may be made in our invention without departing from the spirit thereof, and we do not intend to limit ourselves otherwise than as pointed out in the claims which follow.

Having thus described our invention, what we claim as new and desire to secure by Letters Patent is:

1. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described.

2. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described, said operating mechanism comprising a pneumatic driven yoke operatively connected to said elements.

3. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described, said operating mechanism comprising a driven yoke operatively connected to said elements, and locking means for said casting when in its lowermost position.

4. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described, said operating mechanism comprising a driven yoke operatively connected to said elements, and locking means for said casting when in its lowermost position, said locking means actuated by said yoke.

5. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described, said clinching means associated with said anvil comprising a beveled surface upon said anvil adapted to be wiped across the point of said driven prong.

6. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described, said clinching means associated with said anvil comprising a beveled surface upon said anvil adapted to be wiped across the point of said driven prong, and an arm on said anvil carrying a pin riding in a cam track for moving said anvil.

7. A machine for closing the leaves of a hoop connecting member and the like and driving and clinching the holding prong thereof, which comprises a seat for positioning the connecting member of an anvil and under a ram pintled to a vertically slidable casting, a seat in said casting adapted to receive a portion of the connecting member when in its lowermost position, means for driving said ram to close the leaves of said connecting member and drive said prong, and clinching means for said driven prong associated with said anvil, and an operating mechanism progressively lowering said casting, driving said ram and actuating said anvil clinching means for the purpose described, said clinching means associated with said anvil comprising a beveled surface upon said anvil adapted to be wiped across the point of said driven prong, and an arm on said anvil carrying a pin riding in a cam track for moving said anvil, said cam track positioned in a frame embracing said arm and vertically moved by said yoke.

8. A machine as set forth in claim 1 mounted on a slide adjacent and normal to the course of a conveyor carrying portions of knock down barrels in the process of assembly with the hoops and connecting members in position, and elements on the conveyor and the machine interengaging only when the machine is moved toward the conveyor on the slide.

9. A machine for the purposes described comprising a fluid actuated cylinder mounted on a vertical post and having a piston operatively connected with a yoke, a rod connected to said yoke actuating a ram base, a second rod connected to said yoke actuating a ram pintled to said base, a slidable anvil under said ram and moved by a cam track in a cam slide.

10. A machine for the purposes described comprising a fluid actuated cylinder mounted on a vertical post and having a piston operatively connected with a yoke, a rod connected to said yoke actuating a ram base, a second rod connected to said yoke actuating a ram pintled to said base, a slidable anvil under said ram and moved by a cam track in a cam slide, said cam slide slidably mounted on said post and connected to said yoke by a rod.

11. A machine for the purposes described comprising a fluid actuated cylinder mounted on a vertical post and having a piston operatively connected with a yoke, a rod connected to said yoke actuating a ram base, a second rod connected to said yoke actuating a ram pintled to said base, a slidable anvil under said ram and moved by a cam track in a cam slide, said cam slide slidably mounted on said post and connected to said yoke by a rod, and latching means associated with said base locking the same to said post at its lowermost position.

HARRY GUTHRIE BELL.
JACOB DOUGLAS GAY, Jr.

No references cited.